(No Model.)
E. THUEMMLER.
Thermo-Dynamic Engine.
No. 226,570. Patented April 13, 1880.
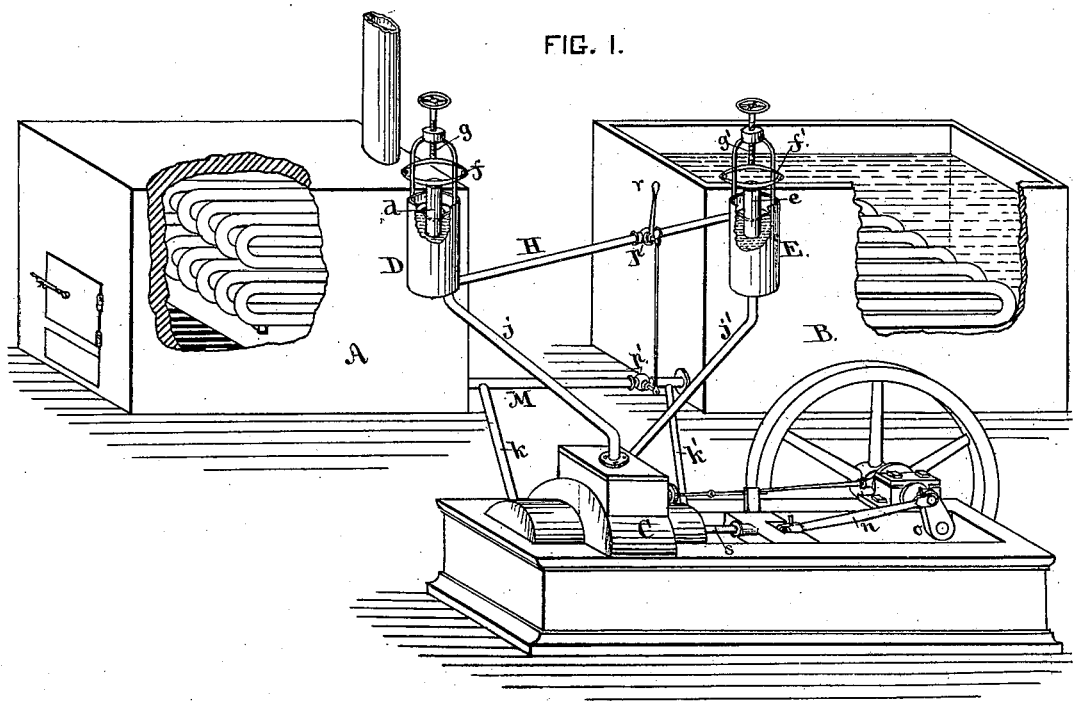
FIG. I.
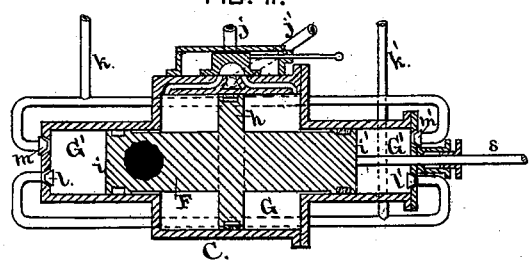
FIG. II.
WITNESSES
INVENTOR
Edward Thuemmler

UNITED STATES PATENT OFFICE.

EDWARD THUEMMLER, OF LITTLE ROCK, ARKANSAS.

THERMO-DYNAMIC ENGINE.

SPECIFICATION forming part of Letters Patent No. 226,570, dated April 13, 1880.

Application filed March 5, 1880. (No model.)

*To all whom it may concern:*

Be it known that I, EDWARD THUEMMLER, a citizen of the United States, residing at Little Rock, in the county of Pulaski and State of Arkansas, have invented a new and useful Thermo-Dynamic Engine, of which the following is a specification.

My invention relates to thermo-dynamic engines; and my object is to subject to control and profitably employ the forces produced by liquids when expanding under the influence of heat, and this without employing the liquid in other than a liquid state; and the invention consists in the construction and arrangement of the parts of a machine which will accomplish said object, as will be hereinafter more fully described, reference being had to the accompanying drawings and the letters of reference marked thereon.

In the accompanying drawings, Figure 1 represents an engine and its reservoirs according to my construction; and Fig. 2 is a representation of the cylinder, piston, valves, and connections in detail.

In the drawings, A represents the heating-reservoir, in which the liquid employed is contained in a coil or other suitably-shaped vessel and is heated by the ordinary means of a furnace.

B is the cooling-reservoir, contained in which, in a coil or other suitably-shaped vessel, the liquid is cooled, preferably by causing the heat from the same to boil and evaporate water, or by any other means. Attached to and communicating with the highest parts, respectively, of the two vessels A and B are drums D and E, each fitted with a plunger, $d$ and $e$, working tight in packings in the tops of the drums and held down by the pressure of springs $f$ and $f'$, the degree of pressure upon the plungers by said springs being regulated by the screws $g$ and $g'$.

C is the engine-cylinder, of which, referring to Fig. 2, F is the piston, consisting of an annular piston, $h\ h$, and a double plunger, $i$ and $i'$, all rigidly connected or made in one, packed and working tight in the central part of the cylinder G and its smaller extensions G' G', all as shown and described. The larger part G of the cylinder is connected with the reservoirs A and B by the pipes $j$ and $j'$, the pipe $j$ introducing the heated liquid from the heater A, and the pipe $j'$ conveying it, after use, to the cooler B, the said pipes serving like the supply and exhaust pipes of an ordinary steam-engine, and the influx and exit of the liquid through said pipes and to and from the cylinder are controlled by a slide-valve or its equivalent, all as shown and described. The reduced parts G' G' of the cylinder are each connected with the two reservoirs by means of the pipes $k$ and $k'$, through inlet-valves $l$ and $l'$ and outlet-valves $m$ and $m'$. Connecting the lowest parts of the two reservoirs A and B is the pipe M, and connecting their highest parts with one another, through the drums D and E, is the pipe H. These pipes M and H are each valved at $p$ and $p'$, and said valves so connected, as shown, that they move uniformly by motion of the lever $r$. This lever $r$ may be moved by hand, or be attached to a governor.

The pipes $k$ and $k'$ connect the cylinder with the pipe M on either side of the valve $p'$, as shown in the drawings. To one end of the piston is attached a piston-rod, $s$, which passes through a stuffing-box, and connects to the connecting-rod $n$, which connects to the crank $o$ and gives motion to the machinery.

The operation of my engine is as follows: The reservoirs and engine being completely filled with the liquid employed, the fire burning in the furnace, and the cooling-reservoir prepared for cooling the liquid, then, so long as the valves $p$ and $p'$ remain open, there will be a constant circulation of the liquid through and from one reservoir to and through the other by means of the pipes H and M, the pipe H rising from the hot to the cold reservoir, and the pipe M placed so as either to run horizontally or to rise in a direction contrary to that of the pipe H, thus sustaining a comparatively uniform temperature in the two reservoirs. If, now, the valves $p$ and $p'$ are closed, the circulation will continue, but in its course will pass through the engine, and there dispose of the power generated, as follows: On closing said valves $p$ and $p'$ the liquid in the hot reservoir A immediately expands, and, having no other outlet, passes into the engine through the pipe $j$, thence exerts its pressure against one side of the annular piston h h, driving it, we will say, forward. Now, as all parts of the engine are filled with liquid, by the arrangement of the inlet and outlet valves, this movement forces the liquid in front of the plunger $i'$, through the valve $m'$ and the pipe $k$, into the lower part of the heating-reservoir A, so that if the areas of the annular piston $h$ $h$ and of the plunger $i'$ were equal there would be an equilibrium of pressure and no motion; but the annular piston exceeds the plunger in area, and thus a movement of the piston is obtained. During this movement, however, the liquid contained on the other side of the annular piston is forced through the exhaust-port and the pipe $j'$ into the cooling-reservoir B, where it is cooled and reduced in volume; at the same time the plunger $i$ has drawn in and filled its end of the cylinder with cool liquid from reservoir B through the valve $l$ and pipe $k'$. The slide-valve being now changed, a similar series of events takes place in the engine in reversed order.

The springs $f$ and $f'$ save the machine from shocks and assist to preserve a regular motion, and are, respectively, so set as to exert in the drum D and heating-reservoir A a pressure equal to that at which the engine is designed to work, and only such pressure in the drum E and cooling-reservoir B as will serve to keep all chambers, pipes, valves, and valve-seats filled with liquid. The plungers $d$ and $e$ are arranged to permit an overflow of liquid whenever the pressure becomes excessive.

Attached to the lever $r$ is a governor, set to allow the valves $p$ and $p'$, or their equivalents, to open to such extent as will, by establishing a greater or less approach to equilibrium of pressure in the two reservoirs, regulate the pressure to the speed of the engine. A pump or its equivalent is attached to the engine, and is worked by the same, so as to keep up the supply of liquid by replacing all that may be lost by waste or leakage.

I preferably employ lard-oil, olive-oil, or cotton-seed oil in my engine as the liquid referred to in above specification.

Having thus described my invention, what I claim, and desire to secure by Letters Patent, is—

1. The method of operating an engine by means of the expansion and contraction of liquids, said expansion and contraction being obtained, respectively, by causing the liquid to pass alternately through heating and cooling coils or vessels and to act on a piston or pistons, substantially as described.

2. In a thermo-dynamic engine, the regulators D E, provided with adjustable plungers $d$ $e$, and suitable connecting-pipes, arranged substantially as and for the purpose specified.

3. In a thermo-dynamic engine, the combination of the heating-reservoir A and cooling-reservoir B with the pipes H and M, provided with valves $p$ $p'$, all arranged substantially as and for the purpose set forth.

4. In a thermo-dynamic engine, the combination of the heating-reservoir A and cooling-reservoir B with the regulators D E and pipes $j$ $j'$, and working parts of the engine, all arranged substantially as shown and specified.

5. In a thermo-dynamic engine, the combination of a cylinder, C, a piston, F, provided with an annular rim, $h$, and reduced ends $i$ $i'$, with pipes $k$ $k'$, and suitable valves $l$ $l'$ $m$ $m'$, arranged substantially as and for the purpose set forth.

EDWARD THUEMMLER.

Witnesses:
JAS. F. WELCKER,
D. P. COWL.